(12) United States Patent
Wallace

(10) Patent No.: US 10,351,327 B2
(45) Date of Patent: Jul. 16, 2019

(54) THERMOFORMED CONTAINER HAVING A WICKING LAYER INTERPOSED BETWEEN DIFFERENTLY-SHAPED OPPOSED FACES AND METHODS OF MAKING THE SAME

(71) Applicant: Converter Manufacturing, LLC, Orwigsburg, PA (US)

(72) Inventor: Millard F. Wallace, Orwigsburg, PA (US)

(73) Assignee: Converter Manufacturing, LLC, Orwigsburg, PA (US)

(*) Notice: Subject to any disclaimer, the term of this patent is extended or adjusted under 35 U.S.C. 154(b) by 0 days.

(21) Appl. No.: 15/100,025

(22) PCT Filed: Dec. 9, 2014

(86) PCT No.: PCT/US2014/069394
§ 371 (c)(1),
(2) Date: May 27, 2016

(87) PCT Pub. No.: WO2015/081348
PCT Pub. Date: Jun. 4, 2015

(65) Prior Publication Data
US 2017/0001786 A1    Jan. 5, 2017

Related U.S. Application Data

(60) Provisional application No. 61/909,670, filed on Nov. 27, 2013.

(51) Int. Cl.
*B65D 81/26* (2006.01)
*B65D 1/34* (2006.01)
(Continued)

(52) U.S. Cl.
CPC ............ *B65D 81/265* (2013.01); *B29C 59/02* (2013.01); *B29C 65/48* (2013.01); *B65D 1/34* (2013.01);
(Continued)

(58) Field of Classification Search
CPC ....... B65D 81/265; B65D 81/264; B65D 1/34
See application file for complete search history.

(56) References Cited

U.S. PATENT DOCUMENTS 1,406,098 A * 2/1922 Speidel ................ B65D 81/265
206/204
2,893,877 A * 7/1959 Nickolls ................ B65D 77/00
156/78

(Continued)

FOREIGN PATENT DOCUMENTS

EP      0 520 509    *  4/1996

*Primary Examiner* — Viren A Thakur
*Assistant Examiner* — Chaim A Smith
(74) *Attorney, Agent, or Firm* — Gary D. Colby

(57) ABSTRACT

The disclosure relates to containers and other shaped articles (e.g., trays and dishes) for containing articles such as food products (e.g., cuts of meat and poultry or liquid-sensitive electronic parts) in shaped articles in which a wicking material is interposed between two thermoformed trays, at least one of which is perforated. Liquid can flow through the perforated tray into the wicking material and then elsewhere (e.g., to a cavity) in the space between the two trays. The disclosure also relates to hollow shaped articles (e.g., bottles and jars) for containing fluids. In manufacture of such hollow shaped articles, the wicking material serves as a manufacturing aid and can be removed after formation of the article.

19 Claims, 9 Drawing Sheets

(51) Int. Cl.
  *B29C 59/02* (2006.01)
  *B29C 65/48* (2006.01)
  *B29L 31/00* (2006.01)

(52) U.S. Cl.
  CPC ...... *B65D 81/264* (2013.01); *B29L 2031/712* (2013.01)

(56) References Cited

U.S. PATENT DOCUMENTS

| | | | | |
|---|---|---|---|---|
| 3,156,402 A * | 11/1964 | Dupuis | ................... | B65D 1/34 |
| | | | | 206/204 |
| 3,468,468 A * | 9/1969 | Foote | ................... | B65D 81/264 |
| | | | | 220/902 |
| 3,610,509 A * | 10/1971 | Winstead | ............ | B65D 81/264 |
| | | | | 206/521.1 |
| 3,834,606 A * | 9/1974 | Andersson | ............... | B65D 1/34 |
| | | | | 206/204 |
| 3,932,575 A * | 1/1976 | Andersson | ............. | B29C 51/14 |
| | | | | 264/154 |
| 5,527,870 A * | 6/1996 | Maeda | ................... | C08F 10/10 |
| | | | | 526/135 |
| 5,655,708 A * | 8/1997 | Grone | ..................... | B65D 1/34 |
| | | | | 229/407 |
| 6,093,751 A * | 7/2000 | Federico | ............. | B65D 81/264 |
| | | | | 521/139 |
| 6,216,855 B1 * | 4/2001 | Grone | ................. | B65D 81/264 |
| | | | | 206/204 |
| 6,983,575 B2 * | 1/2006 | Longo | .................... | B32B 27/08 |
| | | | | 206/204 |
| 8,474,610 B1 * | 7/2013 | Knight | ................ | B65D 81/262 |
| | | | | 206/204 |
| 2001/0033903 A1 * | 10/2001 | Luciano | ............... | B65D 81/264 |
| | | | | 428/34.1 |
| 2003/0203080 A1 * | 10/2003 | Garavaglia | ............. | B65D 1/48 |
| | | | | 426/127 |
| 2004/0163973 A1 * | 8/2004 | Longo | .................... | B32B 27/08 |
| | | | | 206/204 |
| 2007/0160791 A1 * | 7/2007 | Chou | ..................... | B32B 3/266 |
| | | | | 428/36.5 |
| 2010/0193578 A1 * | 8/2010 | Sanders | ............... | B65D 65/403 |
| | | | | 229/120 |
| 2012/0228306 A1 * | 9/2012 | Wallace | ............... | B65D 81/262 |
| | | | | 220/501 |

* cited by examiner

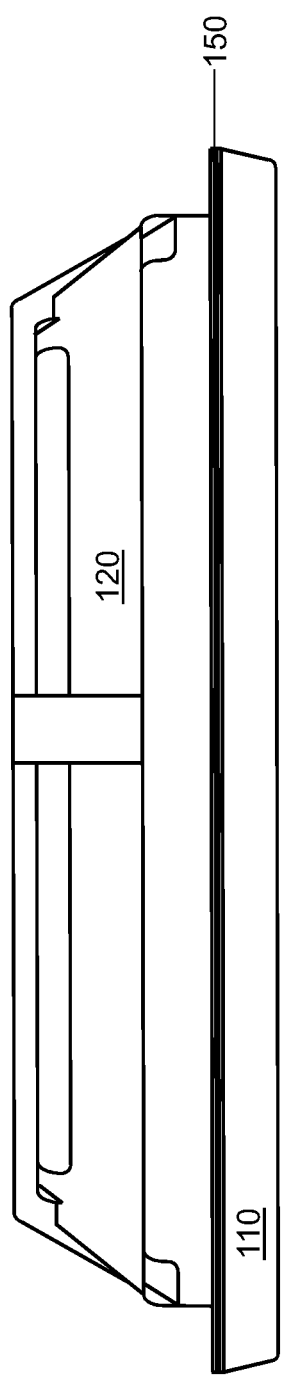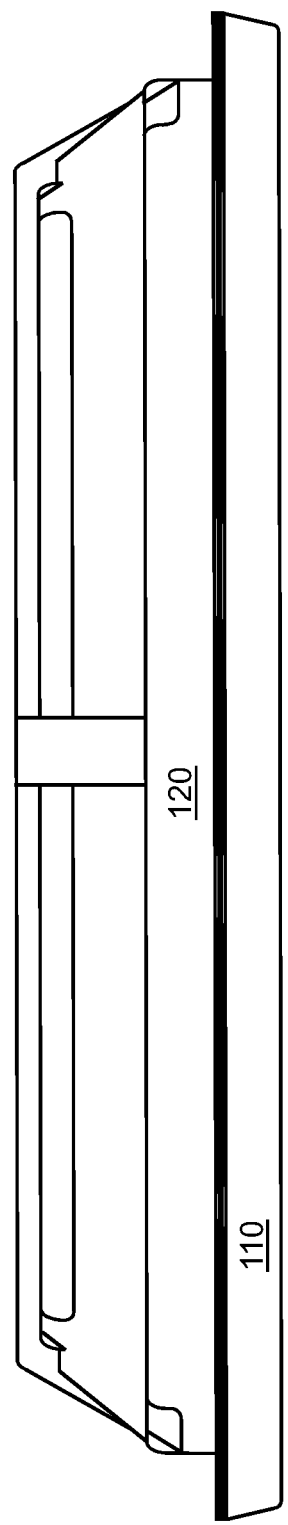

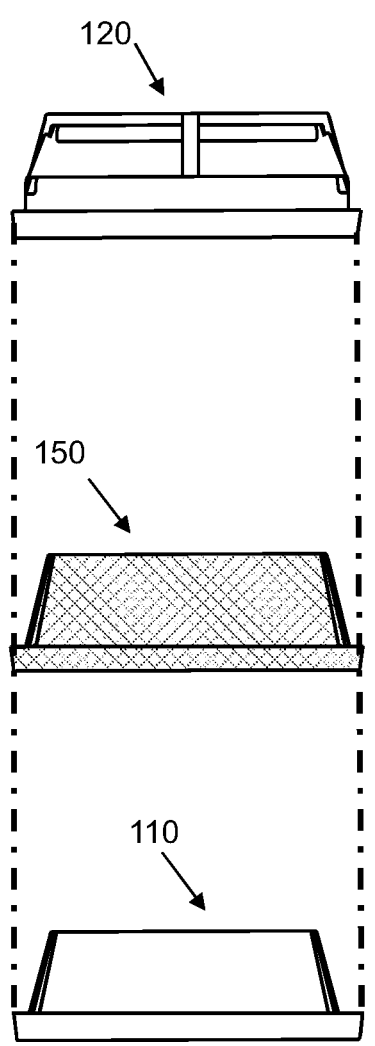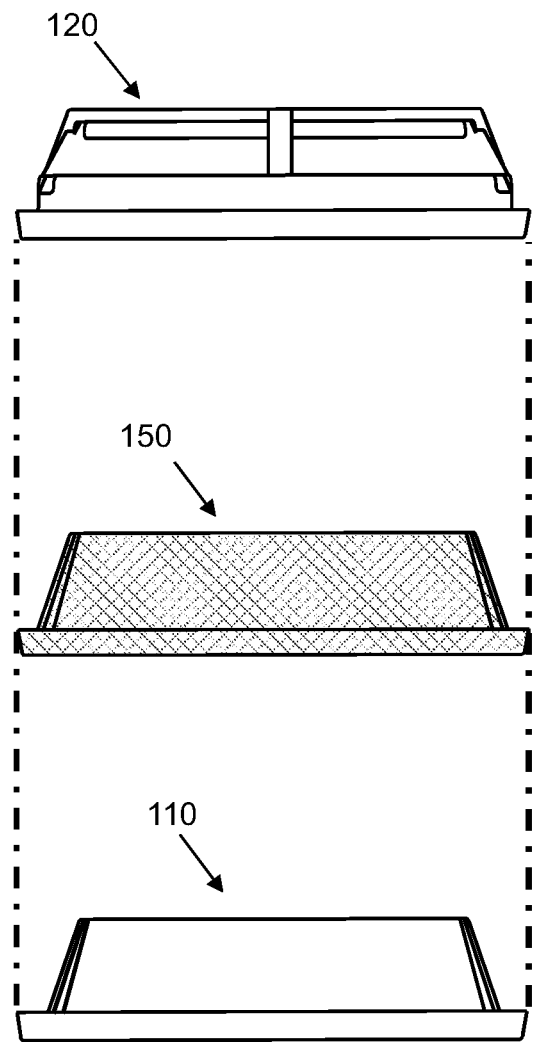

THERMOFORMED CONTAINER HAVING A WICKING LAYER INTERPOSED BETWEEN DIFFERENTLY-SHAPED OPPOSED FACES AND METHODS OF MAKING THE SAME

CROSS-REFERENCE TO RELATED APPLICATIONS

This application is a § 371 filing corresponding to PCT/US2014/069394, filed 9 Dec. 2014, which is entitled to priority to the applicant's U.S. provisional application No. 61/909,670, filed 27 Nov. 2013 which is herein incorporated in its entirety for all purposes.

BACKGROUND OF THE DISCLOSURE

Field of the Disclosure

This disclosure relates generally to thermoformable polymeric materials and articles formed from such materials. In one aspect, the present disclosure relates generally to a tray for supporting items, including liquid-exuding items such as cuts of meat or poultry. In another aspect, the disclosure relates to hollow polymeric articles for containing fluids, such as bottles, that are produced by thermoforming operations.

Packaging Materials, Including Food Packages

Packaging materials are widely used to contain materials for shipping and sale. Particularly when wet items are to be contained and when items which can be damaged by external liquids are to be contained, packaging materials that are relatively impervious to liquids are employed. Because such materials tend to prevent fluid flow across the packaging, they can have the effect of trapping liquid within the packaging, as well as excluding external liquid from contacting the packaged contents.

For example, trays, cartons, and other containers are commonly used to contain and display food items at the point of sale. In such containers, liquid that runs off from or is exuded from items on the container can form a pool or puddle within the container, and it can be undesirable for such a pool or puddle to be visible to one handling the container (e.g., a customer considering whether to purchase the container and its contents). By way of example, cuts of meat and poultry are commonly sold at retail outlets (e.g., in supermarkets or at butcher shops) in packaging containers in which the cut is supported by a plastic or foam tray and wrapped with a polymeric sheet, at least a portion of which includes a clear window through which the cut may be viewed by potential purchasers. By way of further example, prepared solid or semi-solid foods are sometimes packaged in containers having a clear portion through which the food can be viewed.

In either of these situations, the presence of liquid that is visible (either when the package is at rest or upon handling by a potential purchaser) can be considered unsightly and detract from the desirability of the item, as perceived by the potential purchaser. Liquid in a food container can also harbor microorganisms, support their growth, and facilitate their transfer among items within the container, leading to spoilage of food items, appearance of spoilage, or both. Furthermore, transfer of free liquid from one component of a packaged food item to another (e.g., liquid exuded from a cooked meat item and absorbed by a pasta component packaged in the same container) can degrade the desirability or other properties of the food components. In each of these situations, it is desirable that liquid within the container be sequestered.

Known food containers often have absorbent materials (e.g., paper or silica-based absorbents) therein for sequestering undesirable fluid. Such absorbent materials can harbor bacteria and compounds having disagreeable tastes or odors, and these items can be maintained in contact with the contained foodstuff, potentially imparting them to the foodstuff.

A need exists for containers which are capable of containing food in a safe, practical, and marketable condition and which sequester liquids apart from contained foods. Such containers are disclosed herein, as are methods of making and using them.

Bottles, Jars, and Other Fluid Containers

Jars, bottles, and other containers for retaining fluids have been made since nearly the dawn of human civilization. Such containers must be sufficiently rigid to endure the strains associated with manufacturing, filling with liquid, retaining liquid, and dispensing the liquid when desired. The containers must also be sufficiently non-porous to prevent unintended loss of liquid from their interiors.

Fluid containers have been made from a wide variety of materials and in a wide variety of ways. Factors influencing selection materials of construction include their appearance (e.g., color, opacity, and surface texture), their cost, and the ease with which they can be worked to form a container of desired shape and conformation. More recently, with the advent of mass production methods, recyclability of the materials (both of finished containers and of scrap materials generated during their manufacture) has been increasingly valued. Factors influencing selection of container manufacturing methods include their cost and difficulty of performance, the ability of a method to yield a container having the desired shape and other properties, and the suitability of the method for high-volume production operations.

The shapes of fluid containers are selected based on several considerations, including the volume of fluid to be contained, the materials and manufacturing methods available to make the containers, and aesthetic characteristics and intended use of the finished container. Examples of suitable methods include casting, carving, hand-shaping, injection molding, blow molding, and thermoforming.

Thermoforming methods have commonly been used to produce relatively simple containers, such as trays and bowls, which consist of a shaped piece of a planar starting material and can be used to make containers having one or more concavities. However, thermoforming methods have been considered unsuitable for manufacture of containers having more enclosed interiors (such as bottles having a narrow neck and deep jars). This unsuitability stems primarily from the fact that prior thermoforming methods have generally involved drawing (e.g., under vacuum) or pressing one or more planar sheets of a plastic material against the surface of a mold while heating the plastic sufficiently that it conforms to the shape of the mold, and thereafter separating the plastic from the mold. The impracticality of devising a mold which can be used to shape the interior of a container and thereafter withdrawn through a narrow neck of such a container after thermoforming it have limited availability of thermoforming as a method of making bottles and other containers having a hollow interior that communicates with the exterior of the container by way of a narrow opening.

Manufacturing methods such as thermoforming create significant amounts of scrap material. Because the materials used to make containers represent a substantial fraction of the cost of making containers, the ability of a manufacturer to recycle scrap materials can significantly affect the economic viability of a container-manufacturing method.

Improved methods of making containers, including recycling of the containers and scrap material generated during their manufacture, are needed and disclosed herein.

BRIEF SUMMARY OF THE SEVERAL VIEWS OF THE DRAWINGS

FIG. 5, consisting of FIGS. 5A, 5B, 5C, and 5D, is a series of images of a shaped tray 100, made as described herein. FIG. 5C is a side view of the long side; FIG. 5D is side view of the short side.

FIG. 6, consisting of FIGS. 6A, 6B, 6C, and 6D, is a series of images of a disassembled tray, made as described herein and then disassembled to illustrate the conformations of its various parts following its manufacture. FIG. 6C shows (short) side-view images of (from left-to-right) the upper tray 110, the black wicking material 150 layer, and the lower tray 120. FIG. 6D shows (long) side-view images of (from left-to-right) the upper tray 110, the black wicking material 150 layer, and the lower tray 120. In FIG. 6, wrinkling or deformation of materials (relative to the assembled tray shown in FIG. 5) is attributable to stresses applied to the tray during its disassembly.

DETAILED DESCRIPTION

Figure 1:
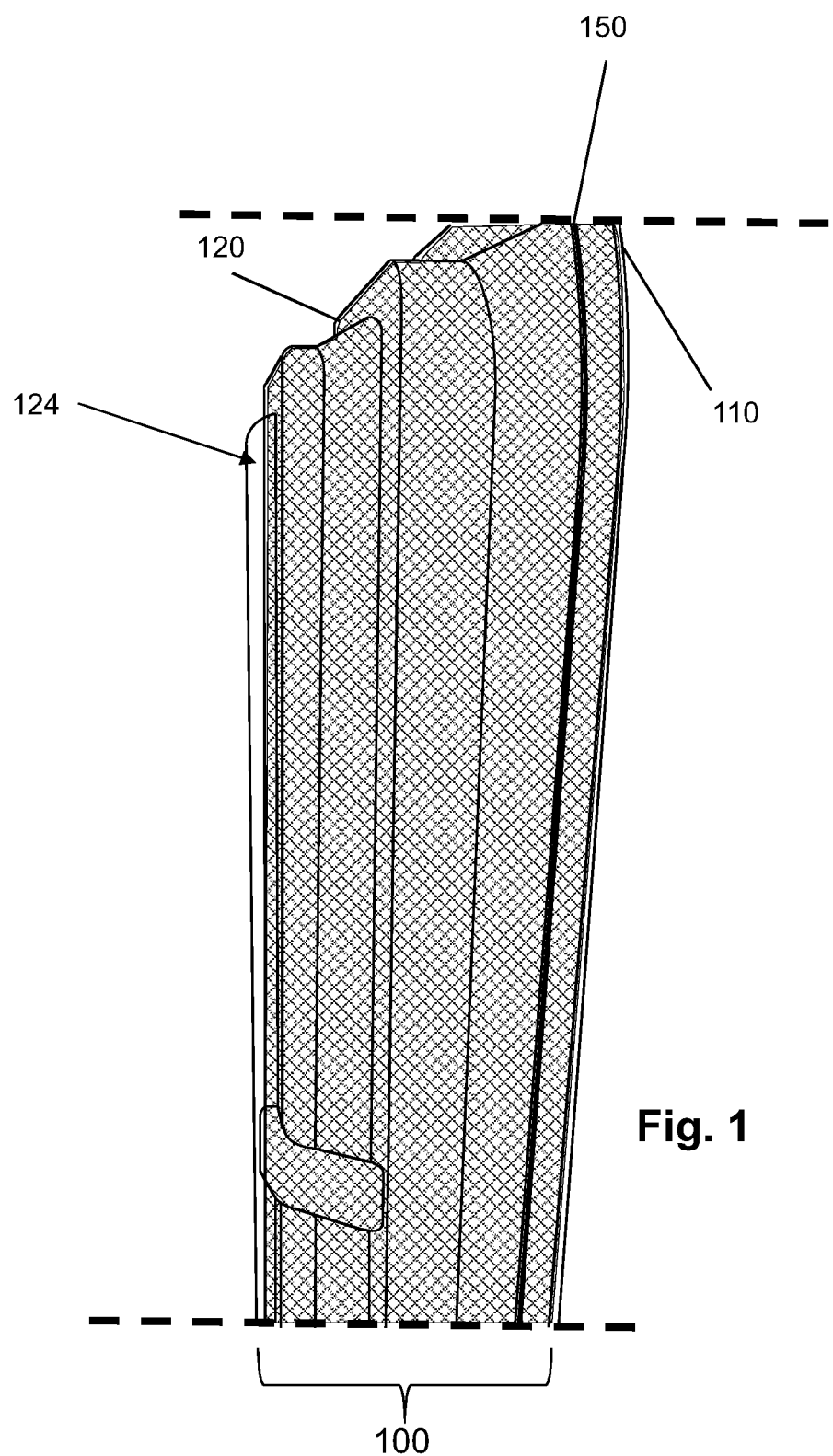
FIG. 1 is an image of a tray 100 described in greater detail herein, the tray shown in this Figure in profile.

The disclosure relates to containers and other shaped articles (e.g., trays and dishes) for containing articles such as food products (e.g., cuts of meat and poultry) or liquid-sensitive electronic parts in shaped articles in which a fibrous wicking material 150 is interposed between two thermoformed trays, at least one of which is perforated. Liquid can flow through the perforated tray into the wicking material 150 and thence elsewhere (e.g., to a cavity) in the space between the two trays.

This disclosure also relates to thermoformable containers having a fibrous wicking material 150 sandwiched between a thermoformable exterior tray and a perforated, thermoformable interior tray 110. Liquid present in the interior tray 110 can pass through a perforation to the space between the interior and exterior trays. When a wicking material 150 is present within that space, the wicking material 150 can induce liquid within the space to spread along or within the wicking material 150 and away from the perforation through which the liquid entered the space. When liquid flows or is wicked away from a perforation, the liquid does not occlude the perforation, permitting more liquid to flow therethrough from the interior 111 of the interior tray 110 into the space. In this way, the tray described herein promotes bulk flow of liquid from the interior 111 of the interior tray 110 into the interstitial space between the interior and exterior trays.

Liquid present in the space between the interior and exterior trays can move within that space if it is not absorbed by the wicking material 150, including under the influence of gravity. If the wicking material 150 is interposed between a perforation that extends through the interior tray 110 and a cavity 124 (e.g., a channel-shaped portion) formed within the exterior tray 120, then the liquid can flow from the perforation, along the wicking material 150, and into the cavity 124. Thus, if an excess of liquid exists or develops in the interior tray 110, the liquid can flow from the interior tray 110, through the perforation(s) and wicking material 150 to the exterior tray 120, and if the exterior tray includes one or more channels 124 (or otherwise-shaped voids), then the liquid can further flow from the wicking material 150 into those voids. Thus, for example, a weeping food item contained within the interior tray 110 can exude liquid which will be sequestered between the interior and exterior trays (where it may not be visible to a potential purchaser of the food item, especially if both trays are opaque). If the wicking material 150 extends to (or beyond) the edges of the interior and exterior trays and those edges are not sealed, then liquid present within the wicking can flow between the interior and exterior trays and out one more lateral edges of the tray.

If flow of liquid out the lateral edges of the interior and exterior trays is to be prevented, then the gap between the trays must be sealed. Such sealing can be achieved in any of several ways. For example, the edges of the trays can be fused or adhered together. Alternatively, the gap between the edges of the interior and exterior trays can be plugged with a filling material or sealed with a tape or other film that spans the gap and is sealed against each of the trays. If the wicking material 150 is fusible with one or both of the interior and exterior trays, then the lateral edges of the trays can be sealed by heating the wicking material 150 and an adjacent tray above their melting point and compressing them against the other tray. If both trays and the wicking material 150 are made of the same or similar materials, both trays and the wicking can be fused along a lateral edge.

If all lateral edges of the tray are sealed, then a sealed container can be formed in which wicking material 150 communicates with the exterior of the container only through the perforations in the interior tray. In such a sealed container, liquid that flows into the wicking material 150 will tend to stay within the inter-tray space of the container, absorbed or disposed in the wicking material 150 or disposed in any cavities defined by the facing portions of the trays.

FIG. 1 shows a three-layer tray in which a layer of wicking material 150 is interposed between clear interior and exterior trays and the edges of all three materials are approximately coextensive. On the right side of the figure, the three laminated materials can be seen in cross-section at a lateral edge of the tray. The wicking material 150 is the lighter colored, fibrous material sandwiched between the clear interior tray material (on the right in the image) and the clear exterior (i.e., lower) tray material (visible on approximately nine-tenths of the figure on the left side). The fibrous wicking material 150 to the left of the laminated lateral edge is visible through the clear exterior tray and is interposed between the exterior tray 120 and the (not visible) interior (i.e., upper) tray 110. At the extreme left of the figure is visible a channel 124 formed in the exterior tray 120. The channel is a cavity 124 that occurs between the interior face of the exterior tray (i.e., the upper surface of the lower tray 120) and the face of the wicking material 150 that is opposed against the exterior tray 120. Not visible on the interior tray 110 are perforations that extend through the interior (upper) tray 110 near the left side of the image. When the tray is oriented with the bottom (left side of the image) of the tray horizontal, liquid that is within the interior tray 110 (e.g., liquid purged from a cut of meat) flows through the perforations in the interior tray 110 under the influence of gravity and contacts the wicking material 150. Irrespective of whether the perforation through which the liquid passes is oriented above the channel 124 formed in the exterior tray 120, liquid is able to flow (under the influence of gravity, of capillary action, or of some combination of these, for example) from the perforation to the channel 124 and there be deposited in the channel 124, permitting further fluid flow to occur through the perforation. Thus, if a cut of meat is placed within the interior portion 111 of the interior tray 110 of the thus-oriented multilayer tray, fluid exuded from the meat can flow to the channel 124 in the exterior tray 120 and there be effectively sequestered from the meat. If, as in this image, the exterior tray 120 is visibly clear, liquid in the channel 124 will be visible to a viewer of the exterior of the tray. However, if the exterior tray 120 is opaque (or if it is coated with an opaque liner sheet), liquid in the channel 124 will not be visible to an exterior viewer.

Figure 2:
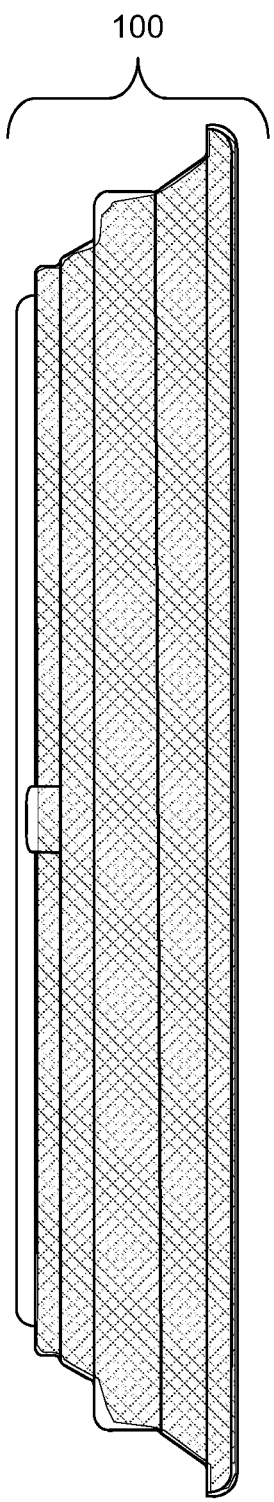
FIG. 2 is an image of a tray 100 described in greater detail herein, the tray shown in profile, viewing its long side.

FIG. 2 is a side view of another tray 100, similar to that shown in FIG. 1. In this tray, however, it can be seen that the interior and exterior trays are fused or adhered to one another about halfway along the lateral edge of the tray that faces the camera. At other positions along the lateral edge, the wicking material 150 is visible between the interior and exterior trays at the lateral edge. However, where the interior and exterior trays are fused, the wicking material 150 cannot be seen between the two trays. The wicking material 150 can be cut away at this sealing portion, so that the interior and exterior trays can be adhered or fused without trapping the wicking material 150 between them. Alternatively (especially if the wicking material 150 is made of a polymer that is identical or highly similar to the polymer(s) on the opposed face of one or both of the interior and exterior trays), the wicking material 150 can be fused or adhered between the interior and exterior trays at the sealing portion. By way of example, when the interior tray, the exterior tray, and the wicking material 150 are all formed from the same polymer, heating these three components and compressing them at the sealing portion can fuse all three layers into a single, substantially unitary piece of material, effectively sealing the inter-tray space at that lateral position. Performing such sealing along the entire lateral edges of the tray can effectively seal the entire inter-tray space (and perforations in one or both trays can communicate with that sealed space.

Figure 3:
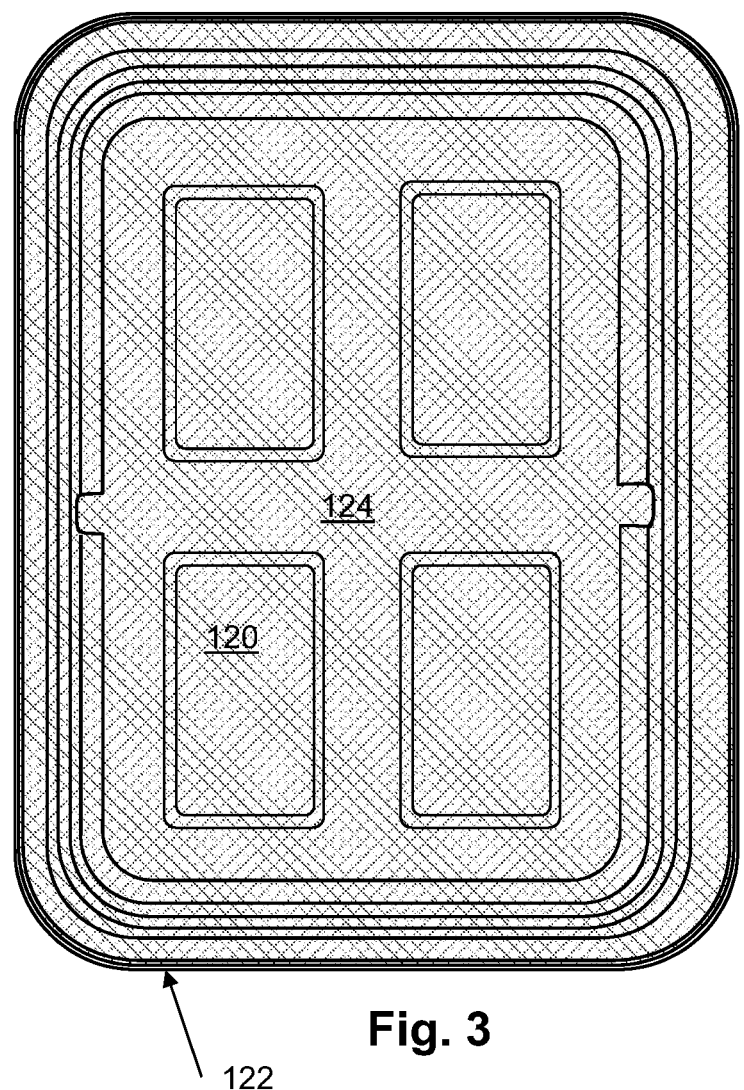
FIG. 3 is an image of a tray 100 described in greater detail herein, the tray shown from the underside thereof.
Figure 4:
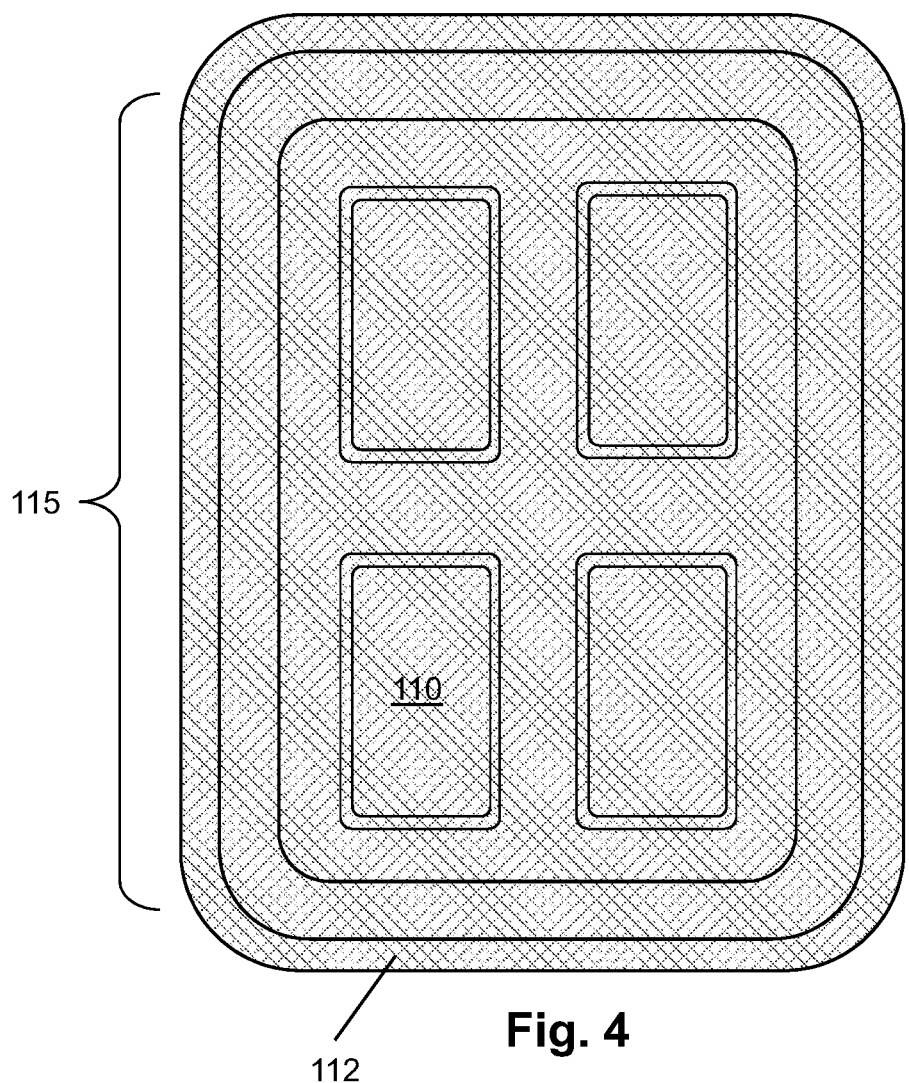
FIG. 4 is an image of a tray 100 described in greater detail herein, the tray shown from the top thereof, the view looking into the interior 111 of the perforated interior tray 110.

FIGS. 3 and 4 are bottom (FIG. 3) and top (FIG. 4) views of one embodiment of an assembled tray 100 as described herein.

FIG. 3 shows the tray 100, as it appears from its bottom side. The bottom face of the tray has a "window pane" appearance (a cross contained within and connecting the sides of a rectangle), with four rectangular portions raised (displaced toward the top of the tray) within a set of channels that surrounds the rectangular portions. The sides of the tray surround the window pane structure and are displaced toward the top of the tray, ending at the lateral edges of the tray in this embodiment. Visible through the (clear, in this embodiment) exterior tray 120 is the fibrous wicking material 150, which appears whitish in this image. The interior tray 110 is not visible in this image, since it is contained entirely within the exterior tray 120 and the wicking material 150.

FIG. 4 shows the tray 100, as it appears from its top side in its intended orientation. In this embodiment, the conformation of the interior tray 110 substantially follows that of the exterior tray 120 (including the window pane structure and its four raised rectangular portions and the sidewalls of the container), except that a portion in the lower right (in the image) is displaced away from the exterior tray 120. The interior tray 110 bears perforations within the interior 111 of the tray that are not readily visible in this image. When liquid flows from the interior portion 111 of the interior tray 110, through the perforations, into the wicking material 150 the liquid is visible (because the interior tray 110 is clear in this embodiment) within the wicking material 150. If the tray is oriented such that the lower right corner is at the lowest point gravitationally, liquid that is in the wicking material 150 can flow to the portion at which the interior dray 110 is displaced away from the exterior tray 120 and gather at that cavity 124.

The visual appearance of the tray shown in FIGS. 3 and 4 is also considered aesthetically pleasing.

FIGS. 5 and 6 show another embodiment of a shaped tray 100 article as disclosed herein. FIG. 5 shows views of an assembled tray, made as described herein. FIG. 6 shows views of a disassembled tray, made as described herein and then disassembled to illustrate the conformations of its various parts following its manufacture.

Figure 5A:
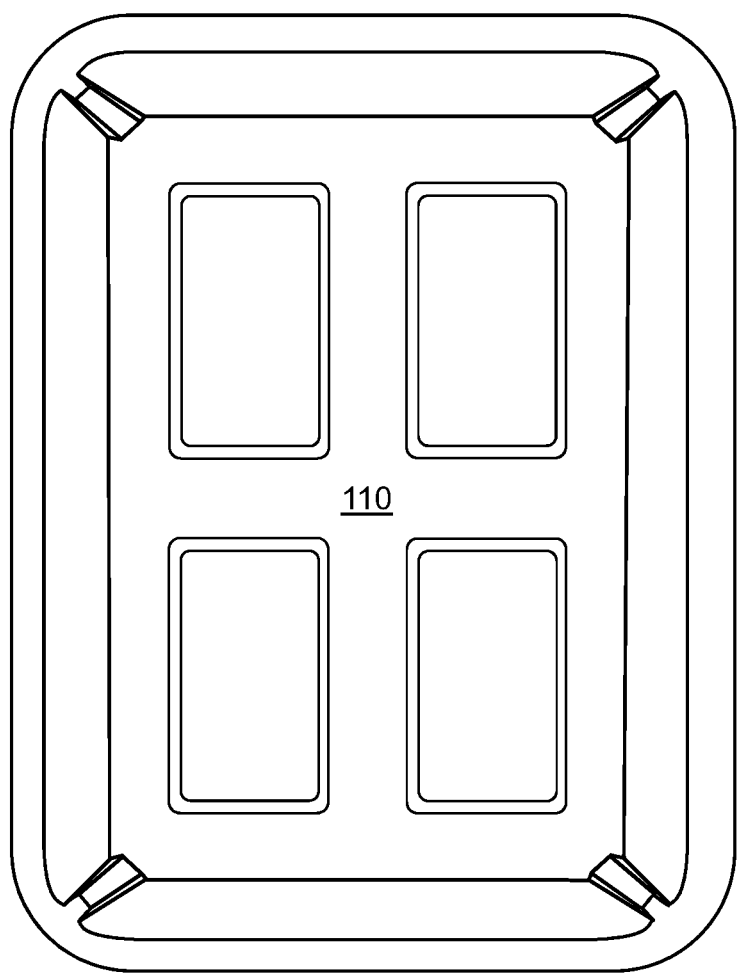
FIG. 5A is a top view.
Figure 5B:
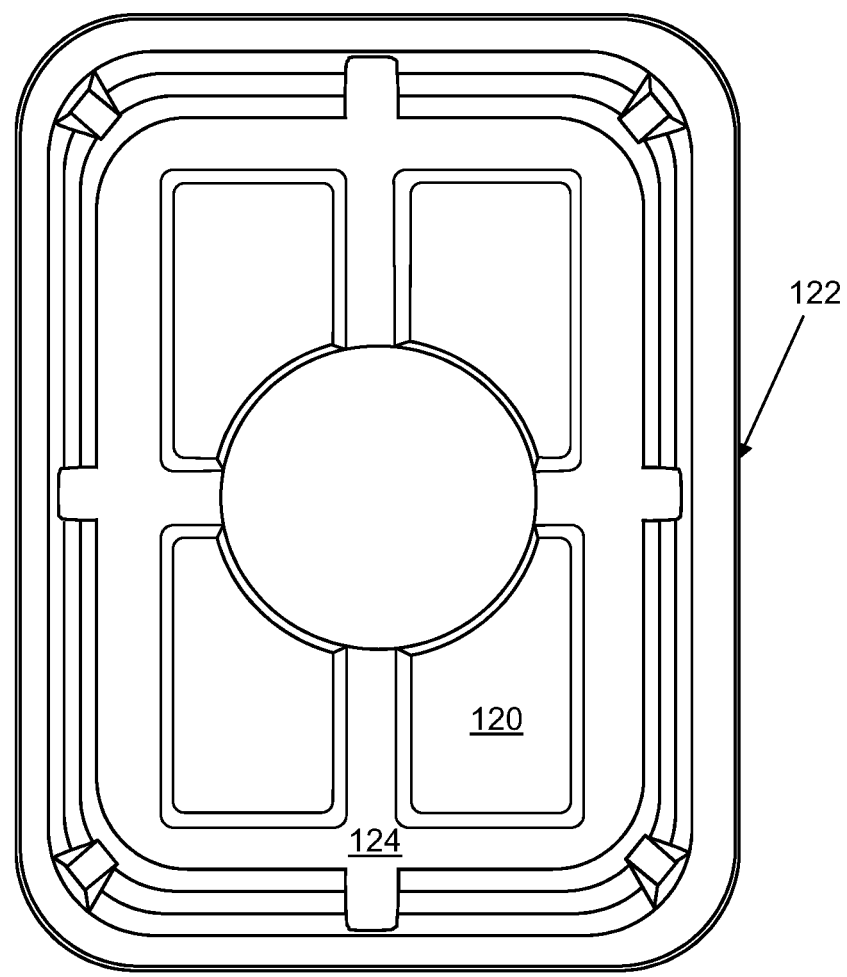
FIG. 5B is a bottom view.

FIG. 5 shows views of an assembled tray. FIG. 5A is a top view, in which the white upper tray 110 can be seen, including the interior 111 of the cavity 115 formed therein. Raised portions (rectangles having rounded corners) within the cavity can be seen and can serve to elevate a weeping food article above the floor of the cavity (i.e., to permit fluid to flow between the raised portions). A peripheral portion (in the shape of a rectangular strip having rounded corners can be seen surrounding the cavity at the lateral edges 112 of the tray. FIG. 5B is a bottom view, in which the white lower tray 120 can be seen, having a circular channel 124 formed in its center with channels 124 extending outwardly therefrom to another channel 124 having the shape of a rectangular strip with rounded corners which also forms the bottom surface of the tray. Surrounding the central circular channel 124 are four raised portions which mirror the raised portions on the upper tray 110, except where they overlap the circular channel 124. This overlapping portion of the upper tray 110 is a favorable location for perforations extending through the upper tray 110. Portions of the upper tray 110 which overlap the rectangular strip-shaped channel 124 in the lower tray 120 also represent favorable location for perforations extending through the upper tray 110. A lip extends about the edge 122 of the lower tray 120 (a small portion of the black-colored wicking material 150 can be seen just beyond the lip), and the lip surrounds the peripheral portion of the lower tray 120, which has the shape of a rectangular strip with rounded corners near the lateral edges of the tray. FIG. 5C is an image of the longer side of the tray, and FIG. 5D is an image of the shorter side of the tray. In each of FIGS. 5C and 5D, a small portion of the black-colored wicking material 150 can be seen between the peripheral lips of the upper and lower trays.

Figures 6A, 6B:
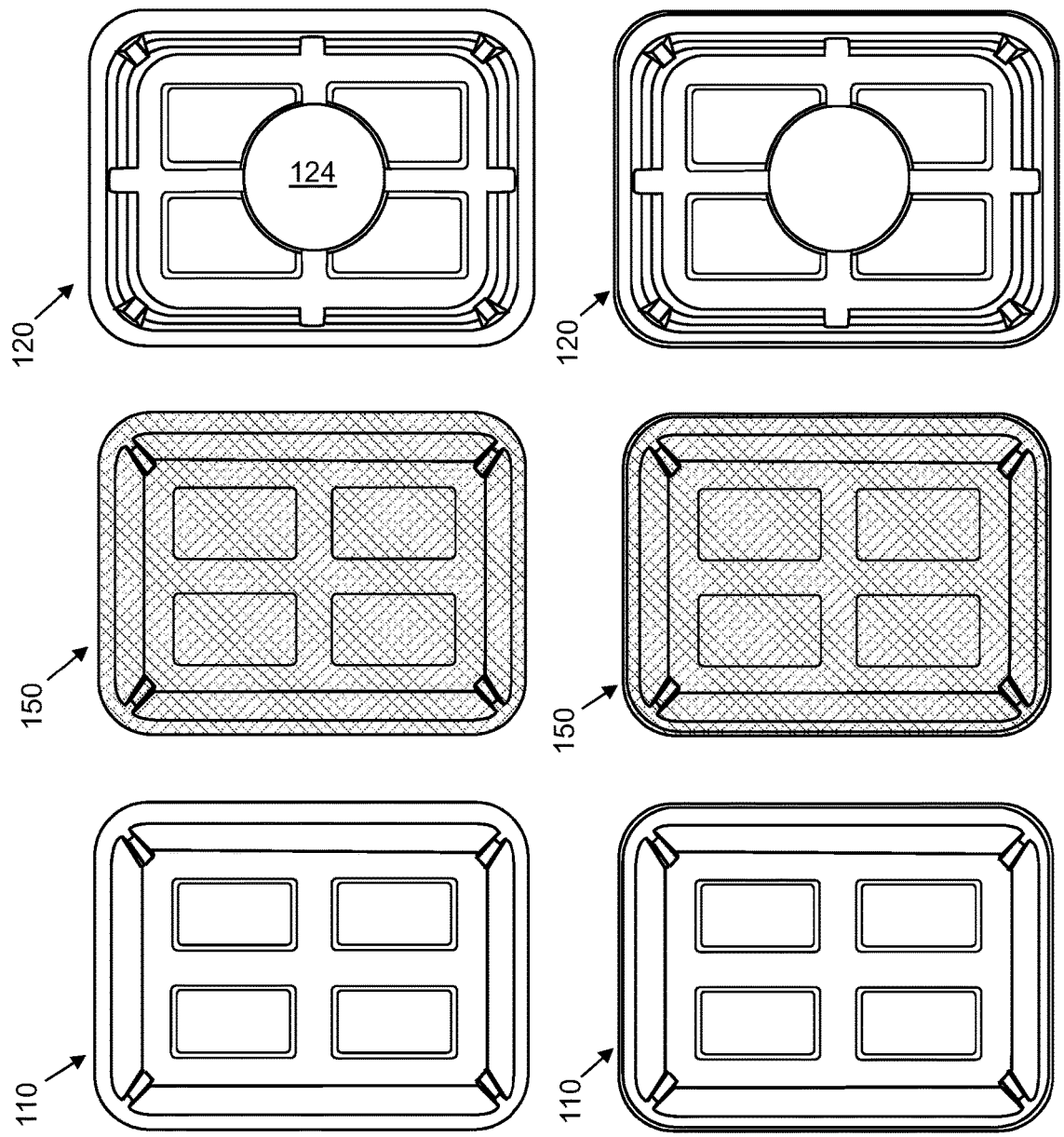
FIG. 6A shows top-view images of (from left-to-right) the upper tray 110, the black wicking material 150 layer, and the lower tray 120.
FIG. 6B shows bottom-view images of (from left-to-right) the upper tray 110, the black wicking material 150 layer, and the lower tray 120.

FIG. 6 shows views of a disassembled tray. FIG. 6A shows upper views of, from left-to-right, the white upper tray 110, the black wicking material 150 layer, and the white lower tray 120 obtained by disassembling a tray made as described herein. FIG. 6B shows lower views of these same items. It can be seen from FIG. 6 that the upper surface of the wicking layer 150 assumes the general conformation of the lower surface of the upper tray 110. This is to be expected, since the originally-flat wicking layer is shaped by deformation of the wicking material 150 sheet against the upper tray 110 polymer sheet which, in turn, is deformed by a male mold surface applied against the upper tray 110 polymer sheet. FIG. 6 also shows that, in this embodiment, at least some features of the upper surface of the lower tray 120 were transferred to the lower surface of the wicking layer 150. This will not necessarily be the case in all shaped articles described herein. For example, if the wicking layer 150 is not compressed against the lower tray 120 (as it is in this embodiment), then features of the lower tray 120 surface will not be impressed into the wicking layer 150.

Shaped Tray Containers 100

The disclosure relates to shaped articles made by thermoforming. In an important embodiment, the disclosure relates to a tray container 100 for drawing and retaining liquid apart from a cavity in the container. Such a tray includes at least three layers, including an upper tray 110 layer that has a cavity 115 therein. One or more perforations extends through the upper tray layer 110, at least some of which are preferably situated within the cavity. The perforation(s) facilitate passage of fluid from the upper surface of the upper tray 110 layer (such as from within the cavity) the the wicking and lower tray 120 layers, which will normally be situated beneath (relative to gravity) the upper tray 110 during use. The shaped tray container 100 includes a lower tray 120 layer intended for retaining fluid which passes through a perforation in the upper tray 110 and, preferably, storing the fluid and keeping it from returning to the upper layer.

Interposed between the upper and lower layers is a wicking layer 150 that performs at least two functions. First, the wicking layer 150 prevents rapid bulk flow (e.g., splashing or flooding) of fluid from the lower tray 120 into the upper tray 110 through the perforations. Thus, the wicking layer 150 preferably substantially covers the lumen of one or more of the perforations in the upper tray 110. Second, the wicking layer facilitates withdrawal of fluid from the upper layer and deposit of the fluid into the lower tray 120. Withdrawal of fluid from the upper tray 110 can be achieved by using a fibrous, absorbent, or other patterned materials. These materials will tend to absorb or wick (e.g., by capillary action) liquid that contacts the wicking material 150. If the identity of the fluid can be anticipated (e.g., foods will tend to exude water-based fluids, while other anticipated contents of the cavity may exude or release non-polar fluids), then that identity can be used to select a wicking material 150 suited for absorption or wicking of the fluid. By way of example, cellulosic materials such as paper tissues or vegetable fibers can be expected to wick water-based fluids. Deposition of fluids into the lower tray 120 can be achieved, for example, by positioning the wicking material 150 atop open spaces in the lower tray 120, so that fluid in the wicking material 150 can flow under the influence of gravity into the open spaces. The lower tray 120 can include shaped channel portions to direct fluid flow to desired portions of the lower tray 120. By way of example, fluid flow can be directed by channels into a central reservoir that does not connect to the upper tray 110 by way of perforations extending directly from the reservoir into the cavity of the upper tray 110; fluid drawn into the reservoir portion of the lower tray 120 will therefore tend not to flow easily into the upper tray 110. Shapes and arrangements of fluid channels, reservoirs, and other structures useful for retaining fluid sequestered from a portion of a cavity are conventional, and any known shapes and connections can be used in the trays described herein.

The shape and arrangement of perforations extending through the upper tray 110 can be selected to facilitate fluid flow in the direction from the interior 111 of the concavity 115 in the upper tray 110 toward the interior 121 of the lower tray 120. By way of example, an upper tray 110 portion having the shape of an inverted cone, with the perforation occurring at a distal portion of the cone, will tend to facilitate passage of fluid from the upper 'broad' end of the conical depression toward the perforation, whence the fluid can drop through the perforation into the lower tray 120. When this structure is inverted, the now-upward-extending portion of the (normally lower) upper tray 110 surface will divert fluid away from the perforation, tending to inhibit fluid flow from the lower tray 120 back into the upper. Similarly, if an absorbent wicking material 150 is situated between the upper tray 110 and the lower tray 120 and is opposed against the lumen of a perforation in the upper tray 110 while being spaced away from the surface of the lower tray 120, then fluid in the upper tray 110 will tend to be absorbed in the vicinity of the perforation, while fluid in the vicinity of the perforation in the lower tray 120 can either be absorbed in the wicking material 150 or remain in the portion of the lower tray 120 that is spaced away from the wicking material 150. This will also tend to cause fluid to remain preferentially in the lower tray 120, rather than in the upper tray 110.

If the fluid is to be retained within the shaped tray article 100 (or if a hygienic seal is needed, such as in a food container), then the peripheral edges 112 and 122 of the upper and lower trays 110 and 120 should be sealed together, and should preferably be aligned to facilitate such sealing. Sealing can be achieved by substantially any known method, such as heat fusion, sonic welding, application of an interposed adhesive, clamping, or other methods. It is important that the wicking layer 150 remain interposed between the edges of the polymer sheets used to form the upper and lower trays during its manufacture, but the wicking layer 150 can be removed from the edges 112 and 122 of the upper and lower trays or sealed at that edge once manufacture (or, at least, shaping of the upper and lower trays) is completed. Sealing can be done at only limited portions of the edges 112 and 122 of the upper and lower tray layers. However, where the shaped tray article 100 is intended to trap liquid between the upper and lower trays, the entirety of the edges of those tray layers and any wicking material 150 interposed between them at those edges 112 and 122 should be sealed.

The upper tray 110 preferably nests within the lower tray 120, with the wicking material 150 interposed between the two trays. The wicking material 150 need not be interposed between the entirety of the two trays. However, for ease of manufacture, a three-layer stack of materials can be used, the stack including an upper thermoformable polymer layer to form the upper tray 110, a lower thermoformable polymer layer to form the lower tray 120, and a continuous wicking layer interposed between the two. In embodiments described herein in which a hollow shaped article is formed by shaping the upper and lower polymer layers in opposite directions (e.g., to form opposite sides of a bottle by shaping the polymer layers apart from one another and joining their peripheries), it is not necessary that the wicking material be continuous. Instead, the wicking material 150 must extend to the peripheral edges of the polymers sheets used in the thermoforming operation (i.e., to facilitate intake of air between the sheets during thermoforming), but the central portion (e.g., corresponding to the interior of the bottle) can be omitted.

In preferred embodiments illustrated in the figures, wicking material 150 nests within a cavity in the lower tray 120 and the upper tray 110 nests within the wicking material 150. Such a shaped tray 100 can be made by thermoforming flat sheets of the three materials simultaneously (the wicking material 150 need not be thermoformable, but should be able to survive the thermoforming process and should be deformable in the process), whether the upper tray 110 is perforated before, during, or after the thermoforming process, or some combination of these.

The upper and lower trays can each have one or more peelable polymeric liner layers on one or both surfaces thereof. Peelable polymer liners are described for example in co-pending U.S. patent application Ser. No. 13/415,781 (U.S. Publication number 2012/0228306). Peelable liners can, for example, bear printed information such as product labels, or they can confer a color, opacity, or texture to the underlying polymer (which can be clear, for example to facilitate its recyclability). Likewise, the shaped trays 100 described herein can be wrapped in or otherwise sealed with a polymeric film, such as a lidstock material described in co-pending U.S. patent application Ser. No. 13/415,781 (U.S. Publication number 2012/0228306). In one embodiment, the upper tray 110 has a peelable surface layer (through which perforations in the upper tray 110 extend) and a lidstock is bonded about the entire perimeter of the surface layer, sealing a foodstuff therein. The "pocket" (lidstock bonded to peelable surface layer) can be peeled from the remainder of the tray (which can then be recycled) and then opened by a user.

An important aspect of the shaped article described herein is that the components of the tray can all be made of the same material (e.g., the same polymer, or different crystalline forms of the same polymer). This facilitates recycling of the shaped article (and of scrap materials generated during its manufacture). Articles which include different polymers can be more difficult or expensive to recycle, and many recycling operations will exclude such articles. If, for example, the upper and lower trays and the interposed wicking material 150 are all constructed of PET, then the used shaped tray 100 can be recycled, even if it contains fluid within it (such fluid can be removed, for example, by shredding the tray and rinsing the shreds).

The Trays

Each of the upper tray 110 (sometimes designated the "interior" tray in this disclosure, although it need not be nested within the lower tray 120, such as when the lower tray 120 is nested within the upper tray 110 or when neither tray is nested within the other) and the lower tray 120 is formed of a thermoformable plastic material, and its composition is not critical. Substantially any of the thermoformable materials described in co-pending U.S. patent application Ser. No. 13/415,781 (U.S. Publication number 2012/0228306) can be used, for example.

An important feature of the upper tray 110 is that it bears perforations sufficient to facilitate the passage therethrough of liquid. The size, shape, and distribution of perforations is not critical. The perforations can, for example be rectangular or circular holes, slits, or voids of irregular shape that extend through the upper tray 110 material. The perforations can be made in the upper tray 110 before, during, or after manufacture of the composite tray described herein. However, for ease of manufacture, it is preferred to use a material that bears perforations prior to composite tray manufacture. Thus, a composite tray can be manufactured by thermoforming three layered sheets of material: a non-perforated thermoformable polymer (to form the lower tray 120), a perforated thermoformable polymer (to form the upper tray 110), and a wicking material 150 interposed between the other two polymer sheets.

In some embodiments, the composition of the thermoformable material selected to form the upper tray 110 is chosen to match, or to be compatible with, one or both of the materials of the lower tray 120 and the wicking material 150, so as to permit bonding or adhesion of the upper tray 110 with one or both of the wicking material 150 and the lower tray 120.

The designations "interior" and "exterior" tray are herein used to refer to a composite tray in which sequestration of liquid present within a concavity of the nested interior and exterior trays is desired. However, by positioning the perforations through one tray on a convexity of the composite tray (e.g., on the exterior tray of an "inverted" tray), sequestration of liquid present on the exterior of the composite tray can be achieved. Thus, the subject matter of this disclosure is not limited to composite trays suitable for sequestering fluid only from the interior of the tray. Indeed, the interior and exterior trays need not be "tray" shaped at all.

Substantially any geometric shape and conformation in which sequestration of liquid at one face within a wicking material 150 contained within a void between two closely opposed "trays" (of whatever shape and conformation selected) can be achieved using the subject matter described herein. Thus, for example, a "pedestal" having a perforated material on its object-supporting face (e.g., a platform on which a melting piece of ice is placed), a closely opposed opposite material, and a wicking material 150 interposed between the perforated and opposed materials can be made.

The Wicking Material 150

The identity of the wicking material 150 is not critical. It is preferably a packed fibrous material, such as a wood pulp, a cotton or linen fabric, or a woven or non-oriented fibrous mat. If the wicking material 150 absorbs a liquid (e.g., as cotton absorbs water), then liquid that contacts the wicking material 150 can be held within the wicking material 150. Liquid that exceeds the absorbance (if any) of the wicking material 150 can nonetheless be distributed within the wicking material 150 through fluid flow induced by capillary action (i.e., fluid flow drawn by surface tension effects in narrow cavities, such as between fibers or between fibers and opposed flat surfaces).

The wicking material 150 can be thermoformable such that it will hold its shape when the upper and lower trays are formed through thermoforming. However, the wicking material 150 need not be thermoformable. Instead, it need merely remain capable of permitting passage of air through its structure during the thermoforming operation (i.e., to facilitate thermoforming of the upper and lower trays as different shapes). Preferably, the wicking material 150 is selected such that it will fuse or adhere with one or both of the upper and lower trays at opposed tray-wicking surfaces when those junctions are subjected to fusion-inducing operations such as heating or sonic welding.

It will be apparent to a skilled artisan that the materials described in this disclosure can be assembled in many different configurations to yield containers and other objects having various specific functionalities.

Food Containers

A significant use for the containers described herein is for containing food products. During storage, shipping, and retail display, many foods must be both contained (to prevent loss or contamination of nearby equipment and products) and protected from environmental conditions (e.g., oxygen-induced degradation, chemical and microbiological contamination, and absorption of non-desired odors). Use of polymeric materials for packaging of foods is widespread, as the physical and chemical properties of polymeric materials can be selected or engineered to provide favorable food storage properties.

Liquid-exuding foods can be stored within the cavity of the upper tray 110, and exudate can flow onto the upper tray 110, thence into a perforation extending through the upper tray 110, and thence into the wicking material 150 interposed between the upper and lower trays. If desired, one or more cavities can be formed between the upper and lower trays (whether or not the cavity is filled with wicking material 150) and the wicking material 150 can be in fluid communication with the interior of the cavity, so that liquid passing through the wicking material 150 can enter and remain within the cavity.

Microbial growth in packaged foods is generally undesirable. Bacterial, fungal, and other microbial growth can occur in fluids when materials (e.g., nutrients) needed by these organisms are present, or when a fluid contacts a surface having microbes thereon. Numerous antimicrobial compounds (some synthetic, others naturally-occurring) are known which inhibit one or more of survival, growth, and proliferation of microorganisms, including antimicrobial agents that inhibit molds, fungi, and bacteria. Others have incorporated antimicrobial agents into plastics and other materials, including into thermoplastics, such as those from which components of food containers, impermeable plastic sheets, porous plastic materials, and absorbent materials can be made. Such antimicrobial agents and plastics can be used in the containers described herein (preferably in components not intended to contact food articles stored in the containers).

At least two types of antimicrobial plastics are known.

First, some antimicrobial plastics merely include one or more antimicrobial agents within them or on their surface, the antimicrobial agent not being chemically bound to the polymer. If the plastic is contacted by a solvent in which the antimicrobial agent is soluble, then the agent can dissolve in the solvent and flow or diffuse away from the plastic in the fluid.

Second, other antimicrobial plastics ("non-leaching" antimicrobial plastics, such as MICROBAN brand antimicrobial plastic products available from Microban Products company) have one or more antimicrobial agents either chemically- or physically-bonded to the plastic or have the agent (s) incorporated into the polymer matrix of the plastic. Little or no antimicrobial agent flows or diffuses away from antimicrobial plastics, even when they are contacted by a liquid in which the unbound antimicrobial agent(s) would otherwise be soluble. Non-leaching antimicrobial plastics are therefore appropriate for use in situations (e.g., food packaging) in which migration of antimicrobial agents away from the plastic is undesirable.

Apart from incorporation into plastics, incorporation of antimicrobial agents into other components that can be used in food trays and other containers is known. For example, antimicrobial agents can be incorporated into the wicking material 150, into films used to wrap or seal the containers, and other surfaces. As with plastics, migration of antimicrobial agents from these materials can be controlled by encapsulating the agents within the material, binding the agents to the materials, or otherwise.

Thermoformable Polymer Sheets

Each of the thermoformable materials described herein is preferably used in the form of thermoformable polymer sheets. The identity and composition of thermoformable polymer sheets used in the articles and methods described herein are not critical. A skilled artisan will recognize that substantially any thermoformable polymeric material can be used. Examples of suitable thermoformable polymeric materials include polyethylene terephthalates, polyesters, polyethylenes (e.g., high density polyethylenes and high molecular weight polyethylenes), polypropylenes, polyvinylchlorides, polystyrenes, nylons, copolymers of these, and combinations of these. Plant-based polymers, such as polylactates (also known as "lactic acid polymers" and PLAs) can also be used. Polymers used for contacting foods should, of course, be selected for compatibility.

Examples of suitable thermoformable polymeric materials for use as substrates include polyethylene terephthalates (e.g., recycled PET or RPET, amorphous PET, and PETG), polyesters, polyethylenes (e.g., high density polyethylenes and high molecular weight polyethylenes), polypropylenes, polyvinylchlorides, polystyrenes, nylons, copolymers of these, and combinations of these. Plant-based polymers, such as polylactates (also known as "lactic acid polymers" and PLAs) can also be used.

A skilled artisan can select a thermoformable polymeric material, or combinations of such materials, suitable for use in substantially any application by considering such properties as the shrink rate, crystallinity, heat deflection temperature, tear strength, draw ratio, thickness, rigidity, melt temperature, thermal conductivity, and polymer backbone orientation of the materials. Selection of materials can also be guided by properties that do not necessarily directly impact the thermoformability of the materials, such as cost, color, opacity, recycled material content, environmental impact, surface energy, chemical resistance, and surface sheen of the materials.

In selecting appropriate materials, an artisan should consider at least two sets of conditions: the environmental conditions to which the finished, shaped article will be subjected and the conditions that the materials will experience during the thermoforming process. Materials should be selected so as to exhibit the desired color, shape, strength, rigidity, and peelability, for example, once the materials have been shaped in the thermoforming process into their final, desired form. The materials should also be selected, together with the thermoforming conditions, so as to allow assembly and shaping of the materials into their final, desired form using thermoforming conditions available to the artisan.

For containers intended to contain foodstuffs (especially for human consumption), special consideration should be given to the choice of substrate materials. If the substrate material contains, or potentially contains (e.g., for recycled substrate materials), any substance injurious to health, the substrate should be used only in conjunction with a liner sheet (and/or barrier sheets or compositions interposed between the substrate sheet and the liner sheet) sufficient to reduce foreseeable migration of the substance from the substrate to the compartment under the conditions of anticipated use. Selection of appropriate materials is within the ken of the skilled artisan in this field.

Hollow Shaped Articles

In many embodiments described herein (e.g., the shaped trays 100), the upper and lower thermoformable polymer sheets are shaped similarly and in a nested conformation during the thermoforming operation. This results in an article constructed largely of three-layer walls (upper and lower polymer sheets, with wicking material 150 interposed), with hollows formed at areas at which the shapes of the upper and lower sheets differ substantially. However, the upper and lower polymer sheets can be thermoformed in different shapes, and even in different directions—for example to form opposite halves of a hollow three-dimensional object, such as a bottle, a vase, or a globe.

In such embodiments, a two-piece molding apparatus is used as in ordinary thermoforming operations. However, unlike normal operations, which include a female mold surface and a male mold surface that generally fits within the female mold surface, hollow articles can be made using thermofolding molds which do not necessarily nest. For example, to form a globe, a pair of hemispherical female mold surfaces can be brought together against the stack described herein. Evacuation of one mold draws the upper polymer sheet against it, and evacuation of the other mold draws the lower polymer sheet against it. Under thermoforming conditions, the sheets will conform to the mold surfaces and can be urged against one another at the periphery of the globe to be formed (mold surfaces which meet at the seam to be formed in the finished article are herein described as "peripherally-matched" molds). So long as the wicking material 150 is interposed between the upper and lower polymer sheets at the periphery, air can be drawn between the sheets to permit their conformation to the mold surfaces, and the globe can be formed.

Similarly, a pair of peripherally-matched "bottle-half" shapes can be thermoformed from the upper and lower polymer sheets from a stack having a wicking layer interposed between the upper and lower sheets. Following thermoforming, the peripherally-matched edges of the bottle-halves can be fused or adhered to one another, either including the wicking material 150 in the fusion/adhesion or removing the wicking material 150 prior to fusion/adhesion. If desired, the void formed within the bottle halves can be reversibly removed be compressing the thermoformed shape (e.g., so that the bottles can be stored and transported in a compressed form on the roll and de-compressed upon filing).

Making the Composite Articles

The articles described herein can be made using known thermoforming apparatus and conditions. Of course, the apparatus and conditions should be selected based on the identity and the characteristics of the materials to be processed. Selection of appropriate thermoforming conditions, based on the identity(ies) of the materials to be processed is within the ken of a skilled artisan in this field.

The composite tray described herein can be made by thermoforming interior and exterior polymer sheets with a wicking material 150 interposed between them. The interior and exterior sheets are preferably thermoformed simultaneously. Because a perforated sheet (such as the interior sheet) can generally not be thermoformed by vacuum drawing, a positive of male mold is preferably used to conform the upper thermoformable polymer sheet to a conformation that is closely opposed against (or nearly against) the exterior sheet, trapping the wicking material 150 between the two sheets. In one embodiment, the lower thermoformable polymer sheet is formed by vacuum drawing the sheet against a negative (female) mold, and the upper thermoformable polymer sheet is formed by applying a male mold (optionally having a vacuum drawn against some or all of the male mold surface) against the upper sheet, all in a single forming operation. As described above for the hollow shaped article, a pair of peripherally-matched female molds can be used to form hollow articles.

Shaped trays 100 and articles are preferably made using mold surfaces and cutting apparatus which yield edges of the upper and lower sheets (and the wicking material 150, if not removed) that closely approximate each other (i.e., the edges align or nearly align), so that sealing, fusing, clamping, or other operations intended to influence both or all sheets can be performed upon the edges of all sheets simultaneously. By way of example, the article illustrated in FIGS. 5 and 6 has a peripheral edge at each of its upper tray 110, wicking material 150, and lower tray 120, whereby the three layers can be sealed to one another by sonic welding.

Thermoforming Apparatus and Conditions

The articles described herein can be made using known thermoforming apparatus and conditions. Of course, the apparatus and conditions should be selected based on the identity and the characteristics of the materials to be processed. Selection of appropriate thermoforming conditions, based on the identity(ies) of the materials to be processed is within the ken of a skilled artisan in this field.

Printing

Text, images, or other graphical material can be printed onto one or more faces of one or more of the polymer sheets described herein. A wide variety of materials and methods can be used to print such material onto the surface of a polymer sheet. A difficulty inherent in printing on polymer materials is that the printed matter can often easily be displaced from the polymer surface by heat, light, or mechanical abrasion, leading to reduced print quality. Furthermore, it can be undesirable for the materials used for printing to contact materials within the compartment.

The tenacity of binding of printed matter to a polymer sheet can, as described herein for adhesives, be affected by surface treatment of the polymer sheet prior to printing upon it. Corona treatment and plasma discharge techniques, for example, can raise the surface energy of a polymer surface, rendering it susceptible to more tenacious binding by the printed matter. Likewise, surface treatment (e.g., Corona treatment) of a polymer surface having printed matter thereon can raise the surface energy of the surface (including the portion on which the printed matter appears). It can be preferably to enhance or reduce the surface energy of the surface of one of two polymer sheets that are adhered or adhesed in an article described herein, so that when the two sheets are separated from one another, most or all of the printed matter at the interface of the two sheets will remain attached to one of the two sheets.

Inks, binders, materials used to prepare a surface to receive printing, and products formed by surface preparation can include products which are undesirable in food products. Thus, when articles described herein are to be used both to carry printing and to contain or contact food products, care should be taken either to select printing and surface preparation materials appropriate for use for food containers (i.e., safe for consumption or insoluble in food) or to create a barrier between food and any such materials (i.e., to prevent their migration into food).

Use of the Composite Tray

The composite tray described herein can be used to isolate fluid contained within the compartment. An important intended use of containers described herein (especially layered reservoir containers) is to contain food products, such as cuts of meat, poultry, or seafood, that have a tendency to release liquid (to "weep," the liquid sometimes being referred to as "purge") or otherwise soil their containers.

Weeping food products contained within the containers described herein weep just as in previously known containers. However, the composite tray is able to sequester purge within the wicking material 150 and (so long as the interior and exterior trays are opaque) out of sight of the consumer.

The disclosure of every patent, patent application, and publication cited herein is hereby incorporated herein by reference in its entirety.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

What is claimed is:

1. A shaped tray container, comprising
an upper tray, bearing a perforation extending therethrough in a concave portion thereof and being fused to form a liquid-tight seal along its entire periphery with the entire periphery of
a lower tray and
the entire periphery of a wicking material interposed between the upper and lower trays and covering substantially the entire concave portion of the upper tray, whereby a fluid path extends between the interior of the concave portion of the upper tray, through the perforation and the wicking material to the lower tray.

2. The tray of claim 1, wherein the upper and lower trays and the wicking material are fused along at least a portion of the periphery of the upper tray.

3. The tray of claim 1, wherein the lower tray has a concave portion within the interior of which are positioned the wicking material and the concave portion of the upper tray.

4. The tray of claim 3, wherein the lower tray has a channel portion within the interior portion thereof, the wicking material not contacting the channel portion of the lower tray.

5. The tray of claim 1, wherein the wicking material is present as a fibrous layer that is opposed against the lower surface of the upper tray over substantially the entire concave portion thereof.

6. The tray of claim 5, wherein the lower tray has a concave portion within the interior of which are positioned the wicking material and the concave portion of the upper tray and wherein the wicking material is opposed against the upper surface of the lower tray over substantially the entire concave portion of the lower tray.

7. The tray of claim 5, wherein the lower tray has a concave portion within the interior of which are positioned the wicking material and the concave portion of the upper tray, the concave portion of the lower tray including a channel portion, and the wicking material being opposed against at least a portion of the upper surface of the lower tray not including the channel portion, whereby a fluid path extends between the interior of the concave portion of the upper tray, through the perforation and the wicking material to the channel portion of the lower tray.

8. The tray of claim 1, wherein the upper and lower trays are formed of the same material.

9. The tray of claim 8, wherein the wicking material is also formed of the same material.

10. The tray of claim 1, wherein each of the upper and lower trays and the wicking material are formed of polyethylene terephthalate (PET).

11. The tray of claim 1, further comprising a polymer film that seals the concave portion of the upper tray.

12. The tray of claim 11, wherein the tray is wrapped in the film.

13. The tray of claim 11, wherein the film is sealed to the upper tray about the entire periphery of the concave portion thereof.

14. The tray of claim 1, wherein the upper tray has a peelable polymer liner sheet laminated against its upper surface, the liner sheet having a perforation therethrough, the lumen of which communicates with the lumen of the perforation extending through the upper tray.

15. The tray of claim 14, further comprising a polymer film that seals the concave portion of the upper tray and is bound to the liner sheet about the periphery of the concave portion of the upper tray.

16. The tray of claim 1, wherein the lower tray has a peelable polymer liner sheet laminated against the lower surface of the lower tray.

17. The tray of claim 1, wherein substantially no part of the concave portion of the upper tray is opposed against the concave portion of the lower tray, except at the peripheries of the concave portions of the upper and lower trays.

18. A packaged food article, comprising the tray of claim 1 and a weeping foodstuff contained within the concave portion of the upper tray thereof.

19. The packaged food article of claim 18, further comprising a polymer film that seals the concave portion of the upper tray.

* * * * *